(12) United States Patent
Lo et al.

(10) Patent No.: US 8,891,707 B2
(45) Date of Patent: Nov. 18, 2014

(54) RECEIVING DEVICE AND METHOD THEREOF

(75) Inventors: Chi-Lun Lo, Taoyuan County (TW);
Chia-Hsin Wu, Taipei County (TW);
Tsung-Ling Li, Pingtung County (TW)

(73) Assignee: MediaTek Inc., Science-Based Industrial Park, Hsin-Chu (TW)

( * ) Notice: Subject to any disclaimer, the term of this patent is extended or adjusted under 35 U.S.C. 154(b) by 579 days.

(21) Appl. No.: 12/761,411

(22) Filed: Apr. 16, 2010

(65) Prior Publication Data

US 2011/0069797 A1 Mar. 24, 2011

Related U.S. Application Data

(60) Provisional application No. 61/244,149, filed on Sep. 21, 2009.

(51) Int. Cl.
*H04B 1/10* (2006.01)
*H04B 1/30* (2006.01)

(52) U.S. Cl.
CPC ...................................... *H04B 1/30* (2013.01)
USPC .......................................................... 375/350

(58) Field of Classification Search
CPC ...... H04B 1/30; H04B 1/0017; H04B 1/0042;
H03H 7/0107; H03H 11/0405; H03H 11/1204;
H03H 17/0273; H03H 17/0286; H03H
2007/0192; H03H 2011/0494
USPC ............................ 375/350; 455/307, 334, 339
See application file for complete search history.

(56) References Cited

U.S. PATENT DOCUMENTS

| | | | |
|---|---|---|---|
| 6,856,794 B1 | 2/2005 | Tso | |
| 7,054,610 B1 * | 5/2006 | Itoh et al. | 455/324 |
| 7,984,093 B1 * | 7/2011 | Tu et al. | 708/819 |
| 2003/0125004 A1 * | 7/2003 | Tolson | 455/296 |
| 2005/0096004 A1 * | 5/2005 | Tso et al. | 455/334 |
| 2005/0124864 A1 * | 6/2005 | Mack et al. | 600/300 |
| 2005/0186935 A1 * | 8/2005 | Kawama et al. | 455/334 |
| 2005/0220224 A1 * | 10/2005 | Dornbusch | 375/324 |
| 2006/0262239 A1 * | 11/2006 | Oana | 349/43 |
| 2007/0132889 A1 * | 6/2007 | Pan | 348/726 |
| 2008/0089445 A1 | 4/2008 | Kuo | |
| 2008/0309827 A1 * | 12/2008 | Kattner | 348/731 |
| 2009/0033424 A1 * | 2/2009 | Nauta | 330/295 |
| 2011/0096933 A1 * | 4/2011 | Eastty | 381/56 |

OTHER PUBLICATIONS

Valentina Della Torre et al., A 20 mW 3.24 mm2 Fully Integrated GPS Radio for Location Based Services, Mar. 2007, p. 602-p. 612, vol. 42, No. 3, IEEE Journal of Solid-State Circuits.

(Continued)

*Primary Examiner* — Aristocratis Fotakis
(74) *Attorney, Agent, or Firm* — Winston Hsu; Scott Margo (57) ABSTRACT

A receiving device includes: a mixer module arranged to receive an input signal to generate a down-converted output; a first active filter, the first active filter arranged to receive the down-converted output and perform an active filtering process upon the down-converted output to generate a first filtered output; a passive filter, the passive filter arranged to receive the first filtered output and perform a passive filtering process upon the first filtered output to generate a second filtered output; and a processing circuit, the processing circuit arranged to receive the second filtered output and process the second filtered output to generate an output signal corresponding to the input signal.

6 Claims, 7 Drawing Sheets

(56) References Cited

OTHER PUBLICATIONS

Giuseppe Gramegna et al., A 56-mW 23-mm2 Single-Chip 180-nm CMOS GPS Receiver With 27.2-mW 4.1-mm2 Radio, Mar. 2006, p. 540-p. 551, vol. 41, No. 3,IEEE Journal of Solid-State Circuits.

Kuang-Wei Cheng et al., A 7.2mW quadrature GPS receiver in 0.13 μm CMOS, Feb. 8-12, 2009, pp. 422-423,423a, ISSCC 2009/Session 24/ Wireless Connectivity/ 24.8, 2009 IEEE International Solid-State Circuits Conference, San Francisco, CA.

Hyunwon Moon et al., A 23mW fully integrated GPS receiver with robust interferer rejection in 65nm CMOS, Feb. 7-11, 2010, pp. 68-69, 69a, ISSCC 2010 / Session 3 / Cellular Techniques / 3.7, 2010 IEEE International Solid-State Circuits Conference, San Francisco, CA.

J-M Wei et al., A 110nm RFCMOS GPS SoC with 34mW-165dBm Tracking Sensitivity, Feb. 8-12, 2009, pp. 254-255, 255a, ISSCC 2009 / Session 14 / Digital Wireless and Reconfigurability / 14.3, 2009 IEEE International Solid-State Circuits Conference, San Francisco, CA.

Antonio Liscidini et al., A 5.4mW GPS CMOS Quadrature Front-End Based on a Single-Stage LNA-Mixer-VCO, Feb. 6-9, 2006, pp. 1892-1901, ISSCC 2006 / Session 26 / Cellular Building Blocks and SOCS / 26.2, 2006 IEEE International Solid-State Circuits Conference, San Francisco, CA.

* cited by examiner

RECEIVING DEVICE AND METHOD THEREOF

CROSS REFERENCE TO RELATED APPLICATIONS

This application claims the benefit of U.S. provisional application No. 61/244,149, which was filed on 2009/9/21 and is included herein by reference.

BACKGROUND

The present invention relates to a low IF (Intermediate Frequency) receiver and method thereof, and more particularly to a large SNR (Signal-to-noise Ratio) wireless receiver and method thereof.

In a wireless communication system, a low IF (Intermediate Frequency) receiver is employed to receive a radio frequency (RF) signal, wherein the RF signal is down-converted into a low (but non-zero) frequency signal such that the low frequency signal is capable of being processed by the following circuits of the receiver. Furthermore, the low IF receiver possesses the advantages of small DC offset and low flicker noise. However, the non-zero down-converted signal may induce some image in the output of the low IF receiver. Conventionally, an image rejection filter is utilized to filter out (i.e., to reject) the image band signal, wherein the image rejection filter is placed between a low-noise amplifier and a down-converted mixer of the receiver. In other words, the image rejection filter is operated under the RF band since the image rejection filter is placed before the down-converted mixer in the receiver. Therefore, the quality factor (i.e., Q factor) of the components composing the image rejection filter should be high enough to meet the required performance of the image rejection filter. One of the solutions is to place the image rejection filter externally, i.e., utilizing an off-chip image rejection filter to reject the RF image band. However, the cost of the off-chip components composing the off-chip image rejection filter may be too high for the receiver. Furthermore, the large area occupied by the off-chip image rejection filter is another problem faced by the conventional art. Therefore, providing a high quality low IF receiver at a low cost that occupies a small area is a significant concern in the wireless communication field.

SUMMARY

According to a first embodiment of the present invention, a receiving device is disclosed. The receiving device comprises a mixer module, a first active filter, a passive filter, and a processing circuit. The mixer module is arranged to receive an input signal to generate a down-converted output. The first active filter is for receiving the down-converted output and performing an active filtering process upon the down-converted output to generate a first filtered output. The passive filter is for receiving the first filtered output and performing a passive filtering process upon the first filtered output to generate a second filtered output. The processing circuit is for receiving the second filtered output and processing the second filtered output to generate an output signal corresponding to the input signal.

According to a second embodiment of the present invention, a receiving device is disclosed. The receiving device comprises a first mixer, a second mixer, an image rejection circuit, an active filter, and a processing circuit. The first mixer is arranged to receive an input signal and generate a first down-converted signal according to the input signal. The second mixer is arranged to receive the input signal and generate a second down-converted signal according to the input signal. The image rejection circuit is for receiving the first down-converted signal and the second down-converted signal and performing an image rejection upon the first down-converted signal and the second down-converted signal to generate a first filtered signal and a second filtered signal. The active filter is for combining the first filtered signal and the second filtered signal to generate a combined output signal. The processing circuit is for receiving the combined output signal and processing the combined output signal to generate an output signal corresponding to the input signal.

According to a third embodiment of the present invention, a receiving method is disclosed. The receiving method comprises the steps of: down converting an input signal to generate a down-converted output; performing an active filtering process upon the down-converted output to generate a first filtered output; performing a passive filtering process upon the first filtered output to generate a second filtered output; and processing the second filtered output to generate an output signal corresponding to the input signal.

According to a fourth embodiment of the present invention, a receiving method is disclosed. The receiving method comprises the steps of: down converting an input signal and generating a first down-converted signal according to the input signal; down converting the input signal and generating a second down-converted signal according to the input signal; performing an image rejection upon the first down-converted signal and the second down-converted signal to generate a first filtered signal and a second filtered signal; performing an active filtering process to combine the first filtered signal and the second filtered signal to generate a combined output signal; and processing the combined output signal to generate an output signal corresponding to the input signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
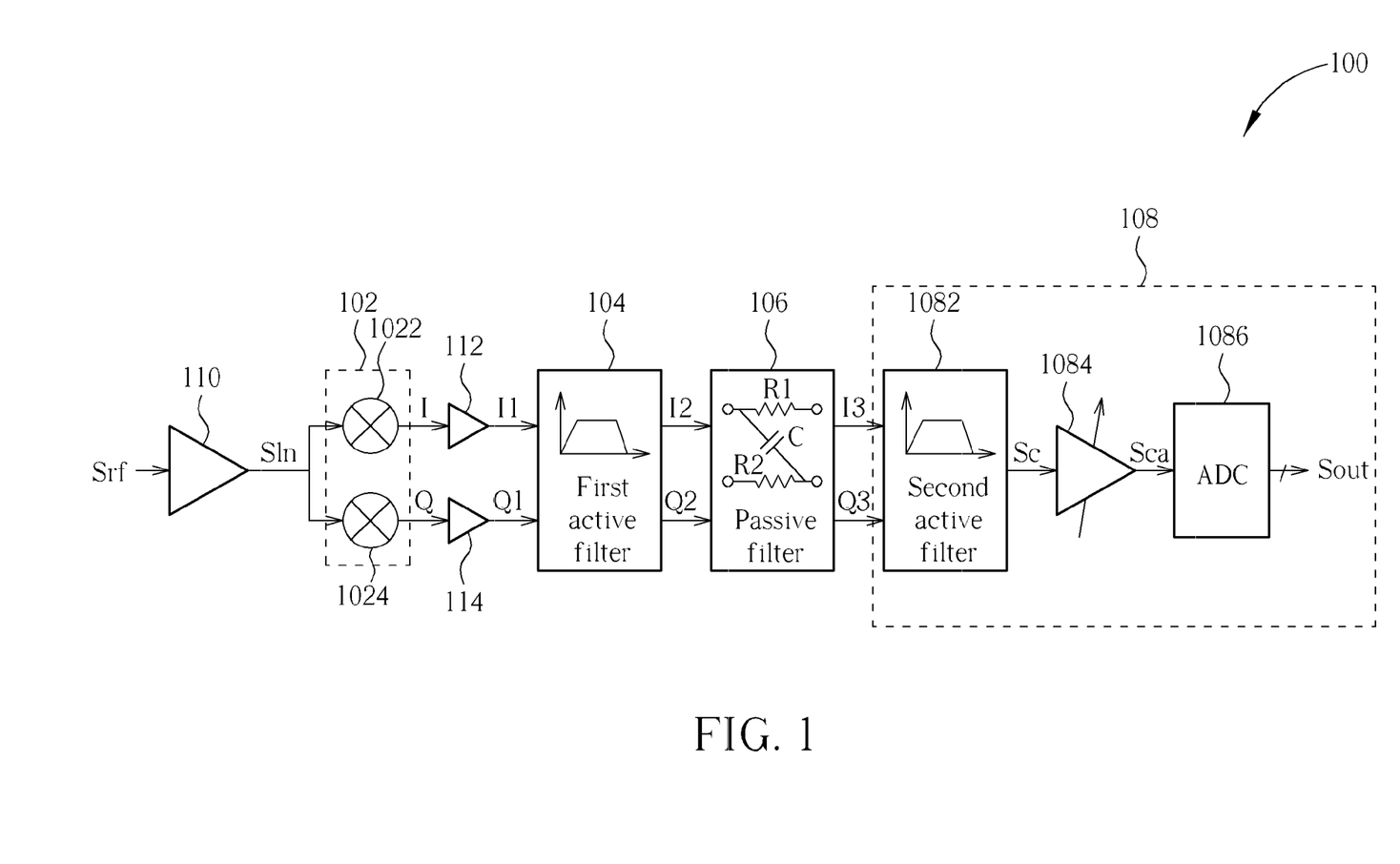
FIG. 1 is a diagram illustrating a receiving device according to an embodiment of the present invention.

FIG. 1 is a diagram illustrating a receiving device 100 according to an embodiment of the present invention. The receiving device 100 is employed for receiving an RF (Radio Frequency) input signal Srf in a wireless communication system. For example, the receiving device 100 may be a low IF (Intermediate Frequency) receiver. The receiving device 100 comprises a mixer module 102, a first active filter 104, a passive filter 106, and a processing circuit 108. The mixer module 102 is arranged to receive the RF input signal Srf to generate a down-converted output. The first active filter 104 is coupled to the mixer module 102, and the first active filter 104 is arranged to receive the down-converted output and perform an active filtering process upon the down-converted output to generate a first filtered output. The passive filter 106 is coupled following the first active filter 104, and the passive filter 106 is arranged to receive the first filtered output and perform a passive filtering process upon the first filtered output to generate a second filtered output. The processing circuit 108 is coupled to the passive filter 106, and the processing circuit 108 is arranged to receive the second filtered output and process the second filtered output to generate an output signal Sout corresponding to the RF input signal Srf. The receiving device 100 further comprises a low noise amplifier 110, which performs a low noise amplifying upon the RF input signal Srf to generate a low noise RF signal SIn. In one example of the embodiment, a first transimpedence amplifier 112 and a second transimpedence amplifier 114 can be optionally implemented between the mixer module 102 and the first active filter 104.

The mixer module 102 comprises a first mixer 1022 and a second mixer 1024. The first mixer 1022 is arranged to receive the low noise RF signal SIn and generate a first down-converted signal I, which is an in-phase signal corresponding to the RF input signal Srf, according to the low nose RF signal SIn. The second mixer 1024 is arranged to receive the low nose RF signal SIn and generate a second down-converted signal Q, which is a quadrature-phase signal corresponding to the RF input signal Srf, according to the low noise RF signal SIn, wherein the above-mentioned down-converted output includes the first down-converted signal I and the second down-converted signal Q. The first transimpedence amplifier 112 converts the first down-converted signal I in current form into a first in-phase signal I1 in voltage form. The second transimpedence amplifier 114 converts the second down-converted signal Q in current form into a first quadrature-phase signal Q1 in voltage form.

The first active filter 104 performs the active filtering process upon the first in-phase signal I1 and the first quadrature-phase signal Q1 to generate a second in-phase signal I2 and a second quadrature-phase signal Q2, and the above-mentioned first filtered output includes the second in-phase signal I2 and the second quadrature-phase signal Q2. The passive filter 106 performs the passive filtering process upon the second in-phase signal I2 and the second quadrature-phase signal Q2 to generate a third in-phase signal I3 and a third quadrature-phase signal Q3, and the above-mentioned second filtered output includes the third in-phase signal I3 and the third quadrature-phase signal Q3.

The processing circuit 108 comprises a second active filter 1082, an operational amplifier 1084, and an analog-to-digital converter (ADC) 1086. The second active filter 1082 is coupled to the passive filter 106 for combining the third in-phase signal I3 and the third quadrature-phase signal Q3 to generate a combined output signal Sc. The operational amplifier 1084, which is a programmable gain amplifier, is coupled to the second active filter 1082 for providing a gain upon the combined output signal Sc to generate an analog signal Sca. The analog-to-digital converter 1086 is coupled to the operational amplifier 1084 for converting the analog signal Sca into the output signal Sout.

According to the embodiment of the receiving device 100, the first active filter 104 is an M-th (i.e., M order) active complex filter, the passive filter 106 is an N-th passive polyphase filter, and the second active filter 1082 is an L-th active filter. In one example of the embodiment, the L-th active filter can be implemented by a real filter. The M-th active complex filter performs the filtering process upon the first in-phase signal I1 and the first quadrature-phase signal Q1 while providing gain to the first in-phase signal I1 and the first quadrature-phase signal Q1. More specifically, the first active filter 104 performs a preliminary image rejection and a preliminary channel selection upon the first in-phase signal I1 and the first quadrature-phase signal Q1 after the RF input signal Srf is down-converted by the mixer module 102, thus the first in-phase signal I1 and the first quadrature-phase signal Q1 are in the low IF (Intermediate Frequency) band. Accordingly, the second in-phase signal I2 and the second quadrature-phase signal Q2 are relatively cleaner than the first in-phase signal I1 and the first quadrature-phase signal Q1 respectively. Moreover, the signal components of the second in-phase signal I2 and the second quadrature-phase signal Q2 are larger than the signal components of the first in-phase signal I1 and the first quadrature-phase signal Q1 respectively since the first active filter 104 has to provide gain to the first in-phase signal I1 and the first quadrature-phase signal Q1. Then, the N-th passive poly-phase filter filters out the remaining images in the second in-phase signal I2 and the second quadrature-phase signal Q2 to generate the cleaned in-phase signal and quadrature-phase signal, i.e., the third in-phase signal I3 and the third quadrature-phase signal Q3 respectively, of the RF input signal Srf.

Generally speaking, the first active filter 104 in combination with the passive filter 106 are arranged to perform the image rejection process upon the RF input signal Srf, and the filter-order of the first active filter 104 in combination with the passive filter 106 is M+N. By doing this, the thermal noise induced by the resistors, e.g., R1, R2 as shown in FIG. 1, in the passive filter 106 is not amplified by the first active filter 104. In other words, the noise generated by the passive filter 106 contributes a minor effect upon the third in-phase signal I3 and the third quadrature-phase signal Q3. Accordingly, the resistors, e.g., R1, R2, in the passive filter 106 can be chosen to have a large size and the capacitor, e.g., C, in the passive filter 106 can be chosen to have a small size when the resonant frequency of the passive filter 106 is kept intact. In should be noted that, the overall size of the passive filter 106 with large resistors and a small capacitor is smaller than the overall size of the passive filter 106 with small resistors and a large capacitor. Since the first active filter 104 provides gain to the first in-phase signal I1 and the first quadrature-phase signal Q1, and the noise generated by the passive filter 106 is not amplified by the first active filter 104, the performance of the signal-to-noise ratio (SNR) of the third in-phase signal I3 and the third quadrature-phase signal Q3 is greatly improved while the size/area of the passive filter 106 is kept small. Furthermore, the first active filter 104 and the passive filter 106 can be integrated with other devices, i.e., the mixer module 102, the processing circuit 108, the low noise amplifier 110, the first transimpedence amplifier 112, and the second transimpedence amplifier 114.

The second active filter 1082 performs the channel selection process upon the third in-phase signal I3 and the third quadrature-phase signal Q3 and combines the third in-phase signal I3 and the third quadrature-phase signal Q3 to generate the combined output signal Sc. Please note that the second active filter 1082 does not limit the order between the channel selection process and the combination process. In fact, in this embodiment, both of the channel selection process and the combination process can be performed together by the second active filter. However, the second active filter 1082 may be designed to perform the channel selection process first and perform the combination process next in one embodiment, or perform the combination process first and perform the channel selection process next in another embodiment, which also falls within the scope of the present invention. Afterwards, the single path combined output signal Sc is outputted from the second active filter 1082. Accordingly, the circuits that follow the second active filter 1082, i.e., the operational amplifier 1084 and the analog-to-digital converter 1086, are the single path. Therefore, the size and power consumption of the receiving device 100 is further reduced by combining the third in-phase signal I3 and the third quadrature-phase signal Q3 into the single path output, i.e., the combined output signal Sc.

In addition, if the first active filter 104 provides M order of filtering effect, the passive filter 106 provides N order of filtering effect, and the second active filter 1082 provides L order of filtering effect, then the filter-order utilized to perform the image rejection process are M+N order (i.e., by utilizing the first active filter 104 in combination with the passive filter 106) and the filter-order utilized to perform the channel selection process are M+L order (i.e., by utilizing the first active filter 104 in combination with the second active filter 1082) in the receiving device 100. In this way, there may be 2*M operational amplifiers (since there have two path in the first active filter 104, in which one path is for filtering the first in-phase signal I1 and the other path is for filtering the first quadrature-phase signal Q1) employed in the first active filter 104 and L operational amplifiers employed in the second active filter 1082, so the total number of operational amplifier in the receiving device 100 is 2*M+L. Here, it is assumed that one operational amplifier provides one order of filtering effect in an active filter. For example, if six-order image rejection process and six-order channel selection process are required in the receiving device 100, then the first active filter 104 may be implemented by an one order active filter, the passive filter 106 may be implemented by a fifth order passive filter, and the second active filter 1082 may be implemented by a fifth order active filter. Therefore, in this embodiment, there may be two operational amplifiers (i.e., 2*M=2, where M=1) employed in the first active filter 104 and five operational amplifiers (i.e., L=1) employed in the second active filter 1082, so the total number of operational amplifier in the receiving device 100 is seven while the conventional receiving device may need as many as twelve or thirteen operational amplifiers under the same filtering condition. This is because the conventional receiving device only employs a two-path sixth order active filter for performing the image rejection process and the channel selection process, in which each path of active filter employs six operational amplifiers (so the total number of operational amplifier is twelve). Furthermore, if a combiner is employed to combine the outputted signals generated by the two-path sixth order active filter, then one more operational amplifier is required, and then the total number of operational amplifier becomes thirteen. Accordingly, the receiving device 100 employs the number of operational amplifier less than the conventional receiving device.

Figure 2:
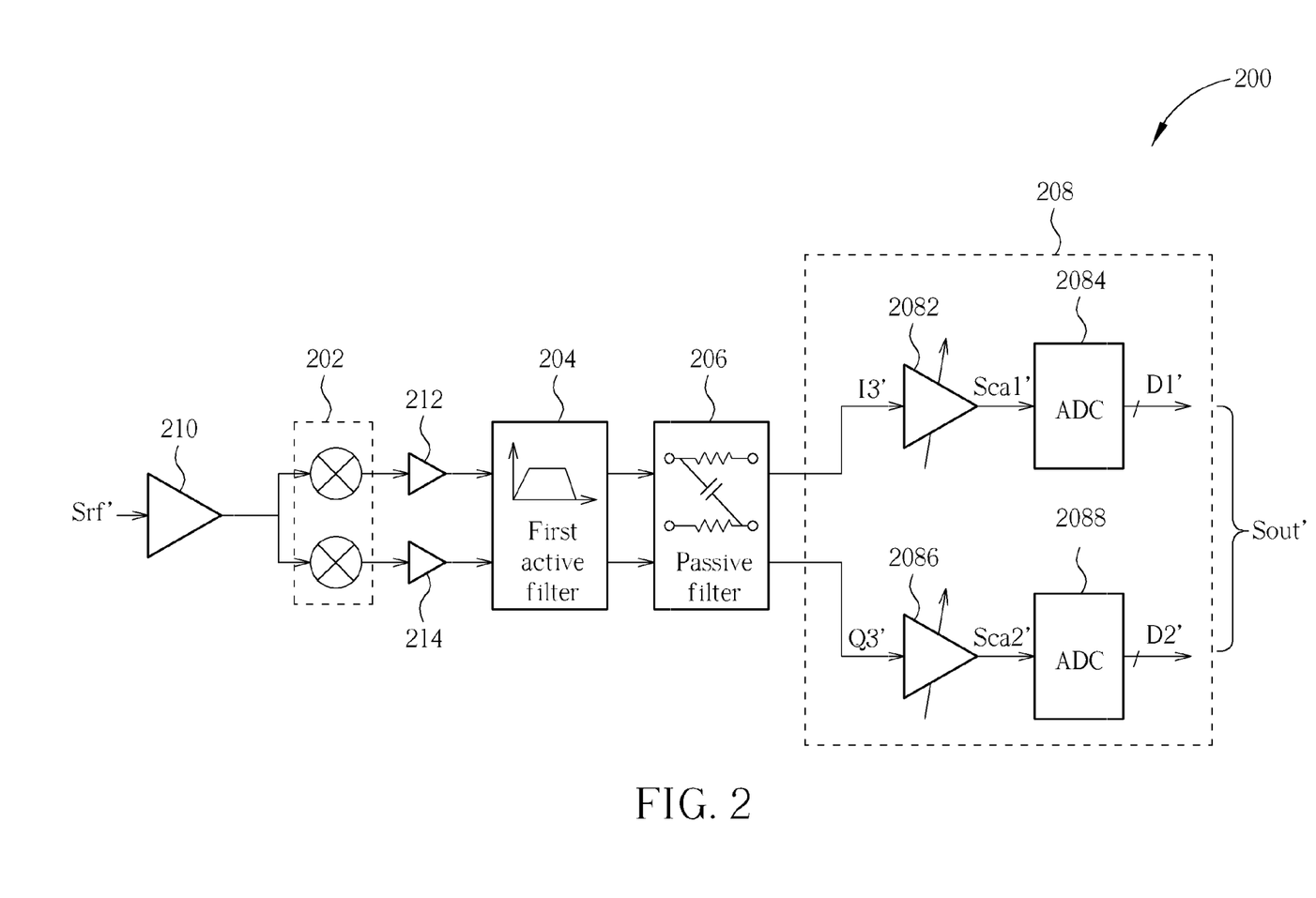
FIG. 2 is a diagram illustrating a receiving device according to a second embodiment of the present invention.

FIG. 2 is a diagram illustrating a receiving device 200 according to a second embodiment of the present invention. The receiving device 200 comprises a mixer module 202, a first active filter 204, a passive filter 206, a processing circuit 208, and a low noise amplifier 210. In one example of the embodiment, a first transimpedence amplifier 212 and a second transimpedence amplifier 214 can be optionally implemented between the mixer module 202 and the first active filter 204. The mixer module 202, the first active filter 204, the passive filter 206, the low noise amplifier 210, the first transimpedence amplifier 212, and the second transimpedence amplifier 214 are similar to the mixer module 102, the first active filter 104, the passive filter 106, the low noise amplifier 110, the first transimpedence amplifier 112, and the second transimpedence amplifier 114 respectively, thus their connectivity is omitted here for brevity. In this embodiment, the processing circuit 208 comprises a first operational amplifier 2082, a first analog-to-digital converter 2084, a second operational amplifier 2086, and a second analog-to-digital converter 2088. The first operational amplifier 2082 is coupled to the passive filter 206 for providing a first gain upon a third in-phase signal I3' to generate a first analog signal Sca1'. The first analog-to-digital converter 2084 is coupled to the first operational amplifier 2082 for converting the first analog signal Sca1' into a first digital signal portion D1' of the output signal Sout'. The second operational amplifier 2086 is coupled to the passive filter 206 for providing a second gain upon a third quadrature-phase signal Q3' to generate a second analog signal Sca2'. The second analog-to-digital converter 2088 is coupled to the second operational amplifier 2086 for converting the second analog signal Sca2' into a second digital signal portion D2' of the output signal Sout'. In addition, the first operational amplifier 2082 and the second operational amplifier 2086 are programmable gain amplifiers.

According to the receiving device 200, the cleaned in-phase signal, i.e., the third in-phase signal I3', and the quadrature-phase signal, i.e., the third quadrature-phase signal Q3', of the RF input signal Srf are processed by different paths, therefore the image rejection process and the channel selection process must be completed in the first active filter 204 and the passive filter 206, wherein the first active filter 204 is an M-th (i.e., M order) active complex filter, and the passive filter 206 is an N-th passive poly-phase filter. It should be noted that, since the configuration of the first active filter 204 in combination with the passive filter 206 is similar to the configuration of the first active filter 104 in combination with the passive filter 106, the first active filter 204 in combination with the passive filter 206 possesses the similar advantages of the first active filter 104 in combination with the passive filter 106 as mentioned in the above paragraph.

Figure 3:
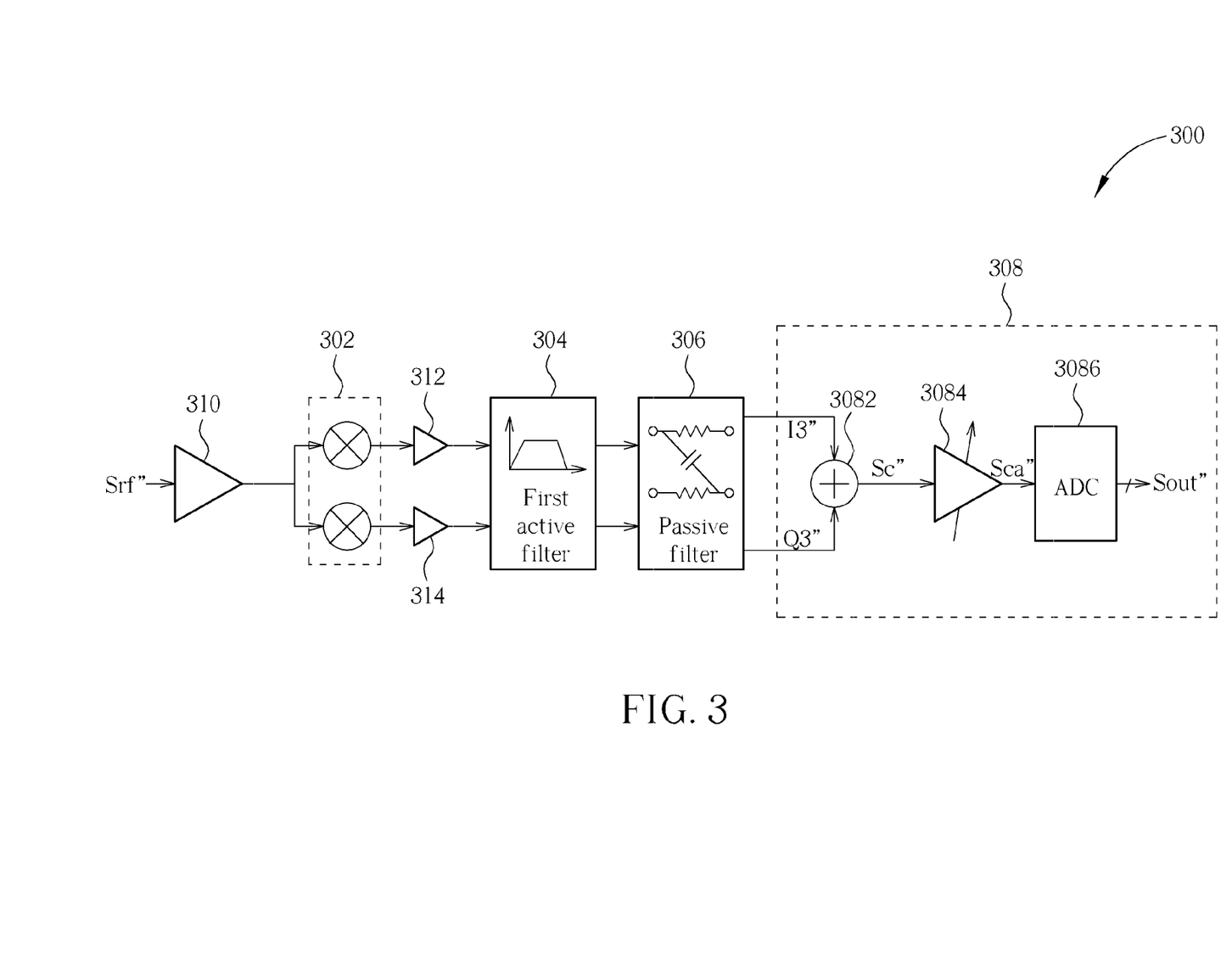
FIG. 3 is a diagram illustrating a receiving device according to a third embodiment of the present invention.

FIG. 3 is a diagram illustrating a receiving device 300 according to a third embodiment of the present invention. The receiving device 300 comprises a mixer module 302, a first active filter 304, a passive filter 306, a processing circuit 308, and a low noise amplifier 310. In one example of the embodiment, a first transimpedence amplifier 312 and a second transimpedence amplifier 314 can be optionally implemented between the mixer module 302 and the first active filter 304. The mixer module 302, the first active filter 304, the passive filter 306, the low noise amplifier 310, the first transimpedence amplifier 312, and the second transimpedence amplifier 314 are similar to the mixer module 102, the first active filter 104, the passive filter 106, the low noise amplifier 110, the first transimpedence amplifier 112, and the second transimpedence amplifier 114 respectively, thus their connectivity is omitted here for brevity. In this embodiment, the processing circuit 308 comprises a combiner 3082, an operational amplifier 3084, and an analog-to-digital converter 3086. The combiner 3082 is coupled to the passive filter 3084 for combining a third in-phase signal I3" and a third quadrature-phase signal Q3" to generate a combined output signal Sc". The operational amplifier 3084 is coupled to the combiner 3082 for providing a gain upon the combined output signal Sc" to generate an analog signal Sca". The analog-to-digital converter 308 is coupled to the operational amplifier 3084 for converting the analog signal Sca" into the output signal Sout". In addition, the operational amplifier 3084 is a programmable gain amplifier.

According to the receiving device 300, the combiner 3082 does not possess the capability of selecting channels, and the combiner 3082 combines the cleaned in-phase signal, i.e., the third in-phase signal I3", and the quadrature-phase signal, i.e., the third quadrature-phase signal Q3", of the RF input signal Srf" to generate the combined output signal Sc", therefore the image rejection process and the channel selection process must be completed in the first active filter 304 and the passive filter 306, wherein the first active filter 304 is an M-th (i.e., M order) active complex filter, and the passive filter 306 is an N-th passive poly-phase filter. Similarly, since the configuration of the first active filter 304 in combination with the passive filter 306 is similar to the configuration of the first active filter 104 in combination with the passive filter 106, the first active filter 304 in combination with the passive filter 306 possesses the similar advantages of the first active filter 104 in combination with the passive filter 106 as mentioned in the above paragraph.

Figure 4:
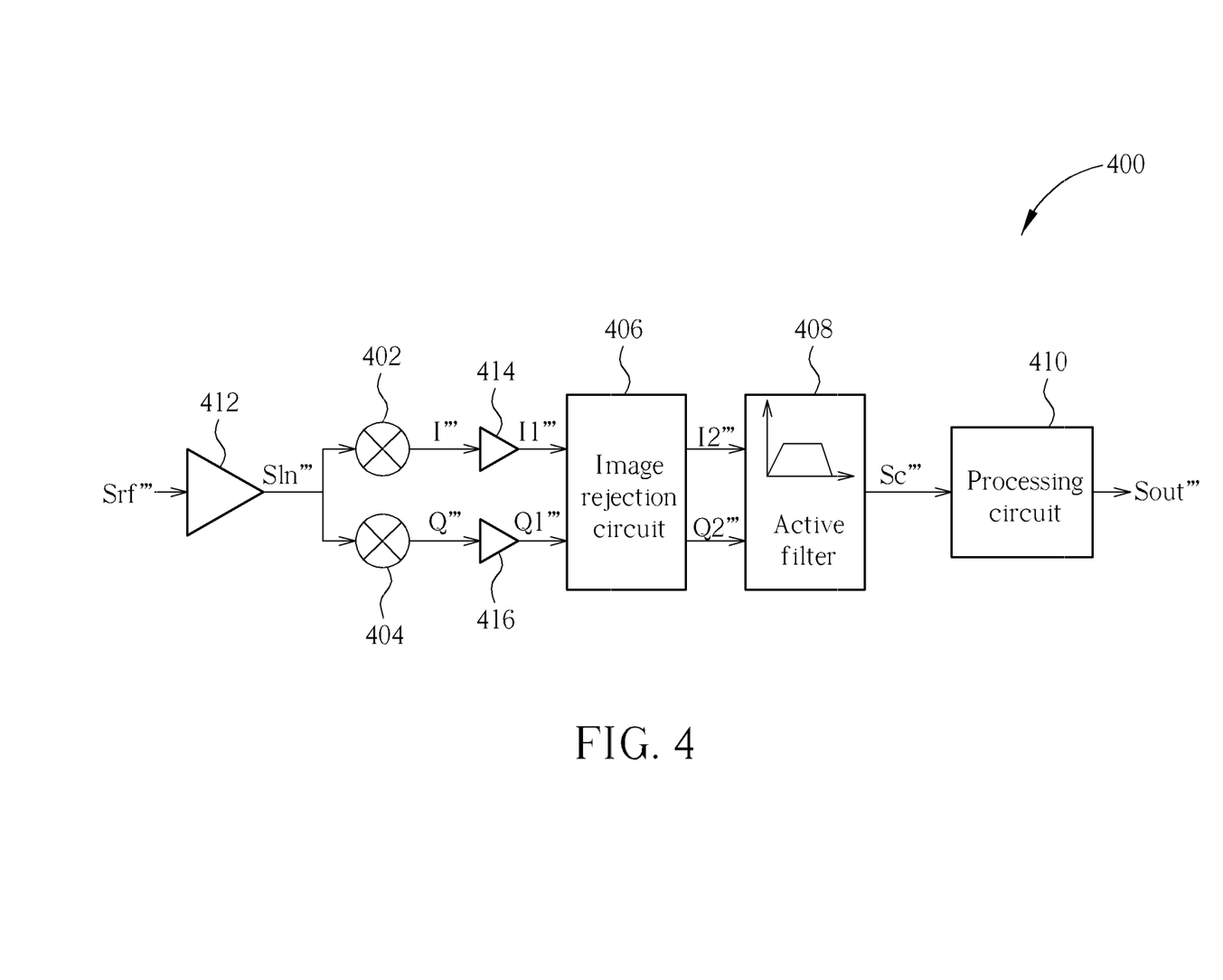
FIG. 4 is a diagram illustrating a receiving device according to a fourth embodiment of the present invention.

FIG. 4 is a diagram illustrating a receiving device 400 according to a fourth embodiment of the present invention. The receiving device 400 comprises a first mixer 402, a second mixer 404, an image rejection circuit 406, an active filter 408, a processing circuit 410, and a low noise amplifier 412. In one example of the embodiment, a first transimpedence amplifier 414 and a second transimpedence amplifier 416 can be optionally implemented between the first mixer 402, the second mixer 404, and the image rejection circuit 406 respectively. The first mixer 402 is arranged to receive the low noise RF signal SIn''' to generate the first down-converted signal I''' according to the low noise RF signal SIn'''. The second mixer 404 is arranged to receive the low noise RF signal SIn''' and generate a second down-converted signal Q''' according to the low noise RF signal SIn'''. The first transimpedence amplifier 414 converts the first down-converted signal I''' in current form into a first in-phase signal I1' in voltage form. The second transimpedence amplifier 416 converts the second down-converted signal Q''' in current form into a first quadrature-phase signal Q1''' in voltage form. The image rejection circuit 406 is coupled to the first transimpedence amplifier 414 and the second transimpedence amplifier 416, and the image rejection circuit 406 is arranged to receive the first in-phase signal I1" and the first quadrature-phase signal Q1''' and perform an image rejection upon the first in-phase signal I1" and the first quadrature-phase signal Q1''' to generate a first filtered signal I2''' and a second filtered signal Q2'''. The active filter 408 is coupled to the image rejection circuit 406 and arranged to combine the first filtered signal I2''' and the second filtered signal Q2''' to generate a combined output signal Sc'''. The processing circuit 400 is coupled to the active filter 408 for receiving the combined output signal Sc''' and processing the combined output signal Sc''' to generate an output signal Sout''' corresponding to the RF input signal Srf'''. In this embodiment, the active filter 408 further performs a channel selection upon the first filtered signal I2''' and the second filtered signal Q2'''.

Figure 5:
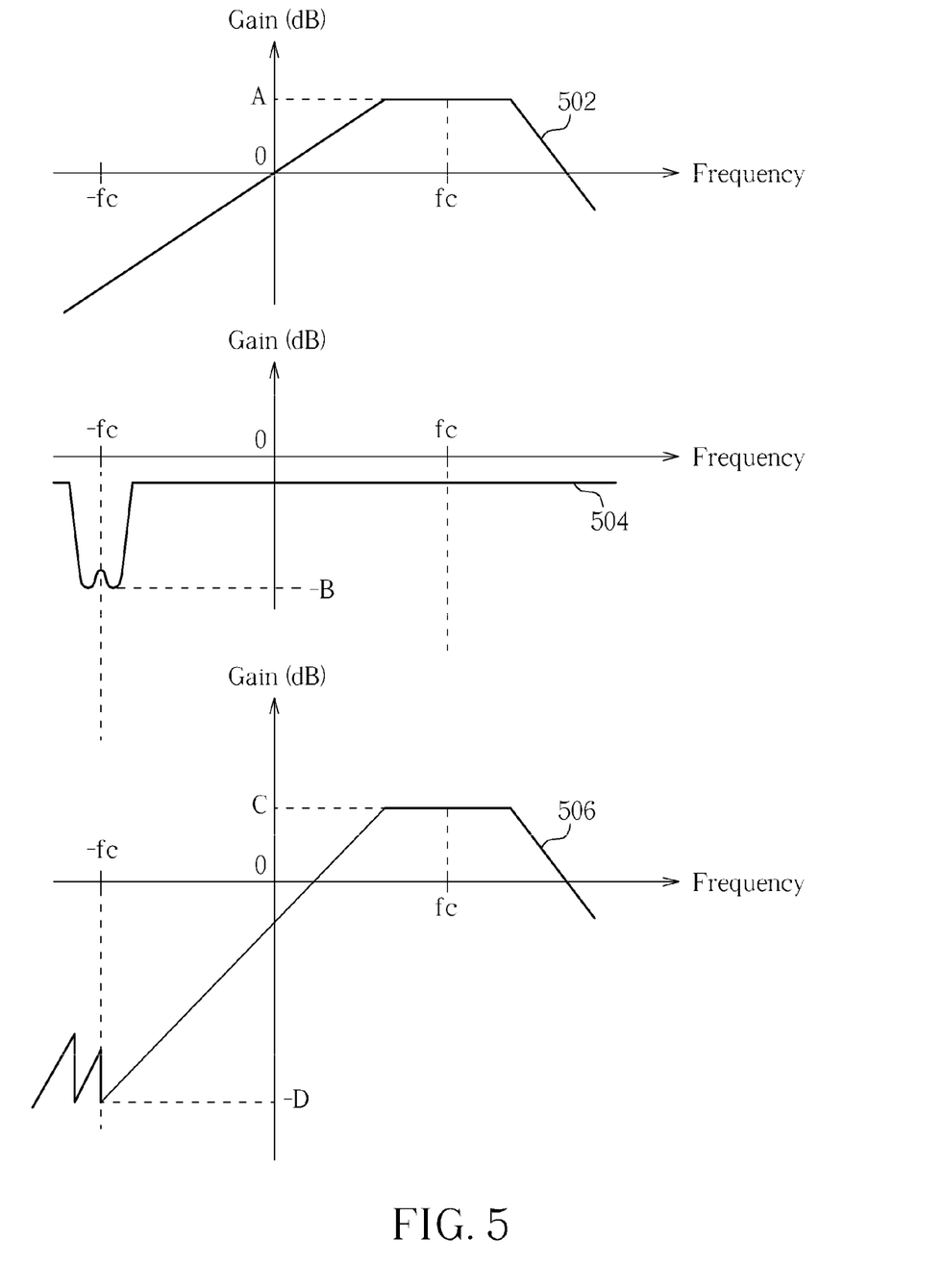
FIG. 5 is a diagram illustrating a frequency response of an active filter and a passive filter according to an embodiment of the present invention.

FIG. 5 is a diagram illustrating a frequency response of the above-mentioned active filters (e.g., the first active filters 104, 204, 304, 408, 1082) and passive filters (e.g., the passive filter 106, 206, 306) according to an embodiment of the present invention, wherein the curve 502 in FIG. 5($a$) is the frequency response of the active filter, the curve 504 in FIG. 5($b$) is the frequency response of the passive filter, and the curve 506 in FIG. 5($c$) is the frequency response of the active filter in combination with the passive filter (e.g., the first active filter 104 in combination with the passive filter 106, the first active filter 204 in combination with the passive filter 206, and the first active filter 304 in combination with the passive filter 306). The active filter is designed to provide a positive gain A (i.e., in dB) upon the first in-phase signal and the first quadrature-phase signal with a positive center frequency of about fc. The passive filter is designed to provide a negative gain B (i.e., in dB) upon the first in-phase signal and the first quadrature-phase signal with a center frequency of about −fc. It should be noted that the gain of the passive filter is always lower than zero in the whole frequency range. Accordingly, the frequency response of the frequency response of the active filter in combination with the passive filter has a positive gain of C at the positive center frequency fc, and a negative gain of −D at the negative center frequency −fc. Therefore, the active filter in combination with the passive filter is capable of filtering out the first in-phase signal and the first quadrature-phase signal with a center frequency of about −fc, and providing the positive gain C for the first in-phase signal and the first quadrature-phase signal with a center frequency of about fc.

Figure 6:
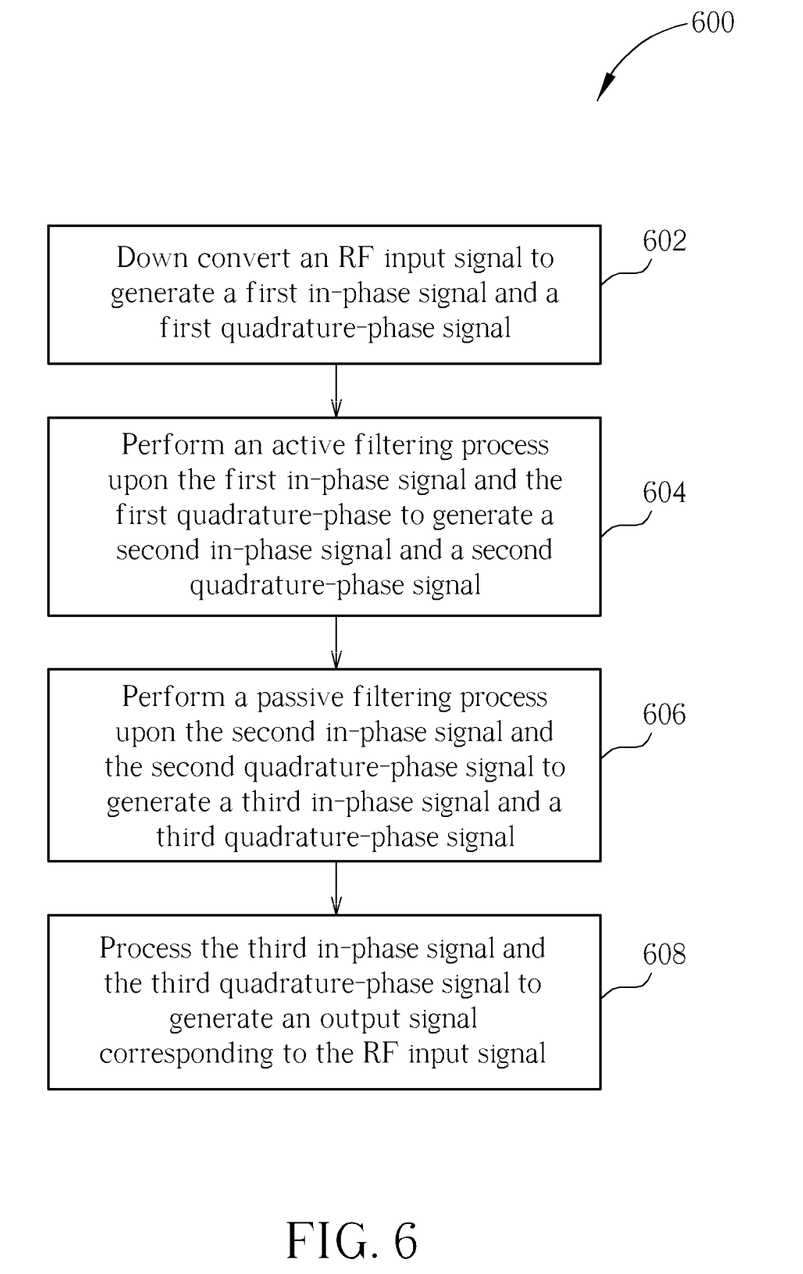
FIG. 6 is a flowchart illustrating a receiving method according to a fifth embodiment of the present invention.

The operations of the above-mentioned receiving devices 100, 200, 300 can be summarized into steps 602-608 as shown in FIG. 6. FIG. 6 is a flowchart illustrating a receiving method 600 according to a fifth embodiment of the present invention. Provided that substantially the same result is achieved, the steps of the flowchart shown in FIG. 6 need not be in the exact order shown and need not be contiguous, that is, other steps can be intermediate. The receiving method 600 comprises the following steps:

Step 602: Down convert an RF input signal to generate a first in-phase signal and a first quadrature-phase signal;

Step 604: Perform an active filtering process upon the first in-phase signal and the first quadrature-phase to generate a second in-phase signal and a second quadrature-phase signal;

Step 606: Perform a passive filtering process upon the second in-phase signal and the second quadrature-phase signal to generate a third in-phase signal and a third quadrature-phase signal; and Step 608: Process the third in-phase signal and the third quadrature-phase signal to generate an output signal corresponding to the RF input signal.

In steps 604 and 606, the active filtering process in combination with the passive filtering process is an image rejection process for the RF input signal. In step 608, the third in-phase signal and the third quadrature-phase signal may be directly combined to generate the output signal, or the third in-phase signal and the third quadrature-phase signal may be performed by a second active filtering process to generate the output signal, in which the second active filtering process includes a channel selection process and a combination process for the third in-phase signal and the third quadrature-phase signal.

Figure 7:
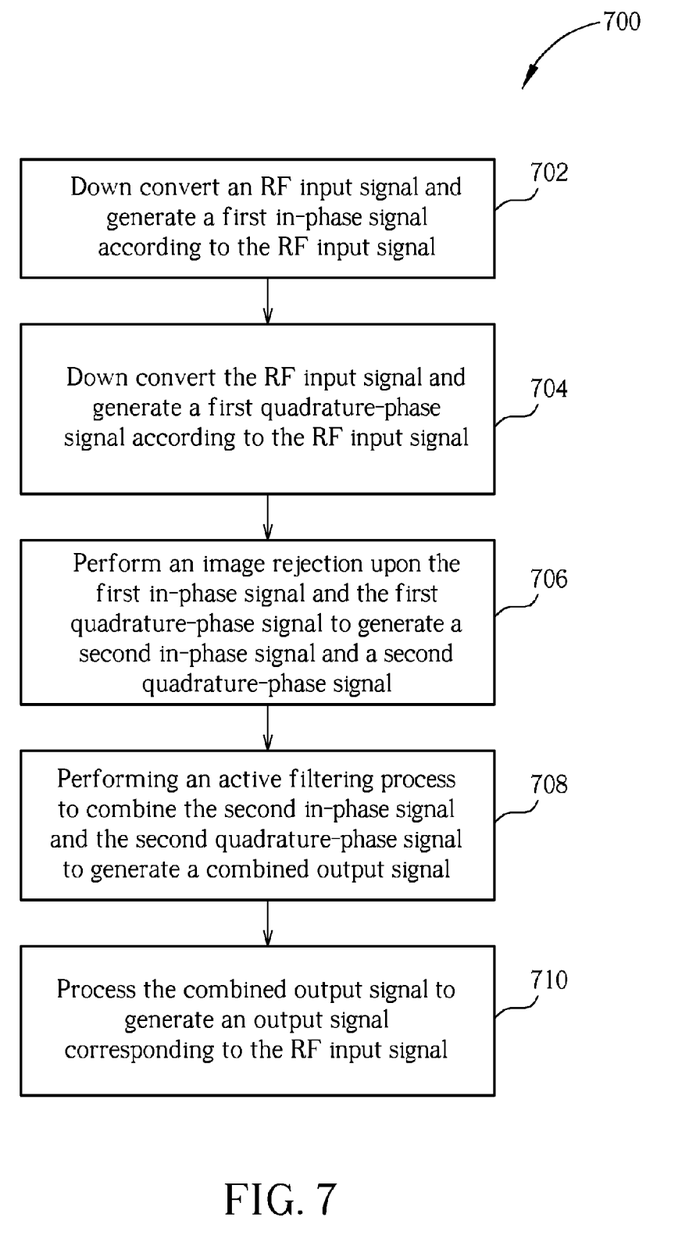
FIG. 7 is a flowchart illustrating a receiving method according to a sixth embodiment of the present invention.

The operation of the above-mentioned receiving device 400 can be summarized into steps 702-708 as shown in FIG. 7. FIG. 7 is a flowchart illustrating a receiving method 700 according to a sixth embodiment of the present invention. Provided that substantially the same result is achieved, the steps of the flowchart shown in FIG. 7 need not be in the exact order shown and need not be contiguous, that is, other steps can be intermediate. The receiving method 700 comprises the following steps:

Step 702: Down convert an RF input signal and generate a first in-phase signal according to the RF input signal;

Step 704: Down convert the RF input signal and generate a first quadrature-phase signal according to the RF input signal;

Step 706: Perform an image rejection upon the first in-phase signal and the first quadrature-phase signal to generate a second in-phase signal and a second quadrature-phase signal;

Step 708: Perform an active filtering process to combine the second in-phase signal and the second quadrature-phase signal to generate a combined output signal; and Step 710: Process the combined output signal to generate an output signal corresponding to the RF input signal.

In step 708, the active filtering process further comprises a channel selection process to select a required channel being the combined output signal.

Briefly, by arranging the active filter in combination with the passive filter in the above mentioned receiving devices, a low IF receiver employing the receiving devices possesses the advantages of low cost, high SNR, small area, low power consumption, and high image rejection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A receiving device, comprising:
a mixer module, arranged to receive an input signal to generate a down-converted output;
a first active filter, arranged to receive the down-converted output and perform an active filtering process upon the down-converted output to generate a first filtered output;
a passive filter, arranged to receive the first filtered output and perform a passive filtering process upon the first filtered output to generate a second filtered output; and
a processing circuit, arranged to receive the second filtered output and process the second filtered output to generate an output signal corresponding to the input signal, and the processing circuit comprises:
a second active filter, for receiving the second filtered output and performing an active filtering process upon the second filtered output;
wherein the first active filter has a positive gain, and at least one of the passive filter and the second active filter has a negative gain.

2. The receiving device of claim 1, wherein the first active filter in combination with the passive filter are arranged to perform an image rejection upon the down-converted output, and the first active filter in combination with the second active filter are arranged to perform a channel selection upon the down-converted output.

3. The receiving device of claim 1, wherein the first active filter is an active complex filter, and the passive filter is a passive poly-phase filter.

4. The receiving device of claim 1, wherein the down-converted output comprises a first down-converted signal and a second down-converted signal, and the mixer module comprises:
a first mixer, arranged to receive the input signal and generate the first down-converted signal according to the input signal; and
a second mixer, arranged to receive the input signal and generate the second down-converted signal according to the input signal;
wherein the first active filter performs the active filtering process upon the down-converted output to generate the first filtered output including a first filtered signal and a second filtered signal; and
the passive filter performs the passive filtering process upon the first filtered output to generate the second filtered output including a third filtered signal and a fourth filtered signal.

5. The receiving device of claim 1, wherein the second active filter combines the third filtered signal and the fourth filtered signal to generate a combined output signal, and the processing circuit further comprises:
an operational amplifier, for providing a gain upon the combined output signal to generate an analog signal; and
an analog-to-digital converter, for converting the analog signal into the output signal.

6. The receiving device of claim 5, wherein the operational amplifier is a programmable gain amplifier.

* * * * *